(No Model.)

F. N. JEWETT.
DEVICE FOR OPENING HOT BOILED EGGS.

No. 462,049. Patented Oct. 27, 1891.

Witnesses:
Louis H. Frick
Otto E. Hoddick

Inventor
Franklin Nelson Jewett
By W. F. Mill
Attorneys

UNITED STATES PATENT OFFICE.

FRANKLIN NELSON JEWETT, OF FREDONIA, NEW YORK.

DEVICE FOR OPENING HOT BOILED EGGS.

SPECIFICATION forming part of Letters Patent No. 462,049, dated October 27, 1891.

Application filed July 17, 1889. Serial No. 317,841. (No model.)

*To all whom it may concern:*

Be it known that I, FRANKLIN NELSON JEWETT, a citizen of the United States, residing at Fredonia, in the county of Chautauqua and State of New York, have invented a new and useful Device for Opening Hot Boiled Eggs, of which the following is a specification.

The object of my invention is to provide means for rapidly and easily cutting the shell of a hot boiled egg, of which the following is a full description.

Figure 1:
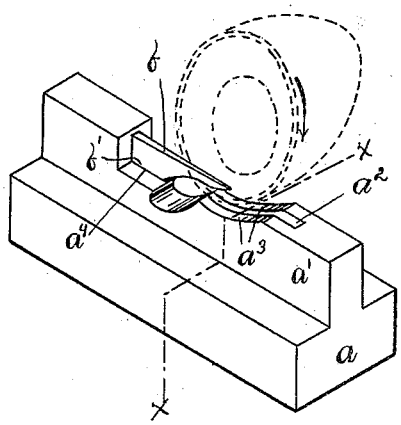
Figure 2:
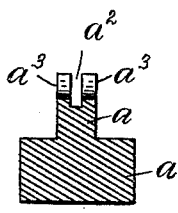
Figure 3:
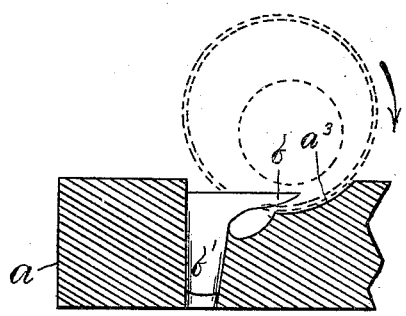
Figure 4:
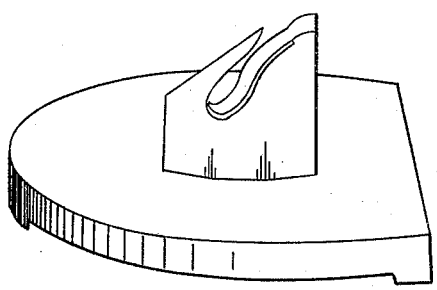

Referring to the drawings, consisting of one sheet, Figure 1 is a perspective view of my device. Fig. 2 is a cross-section of the same on line $x\ x$, Fig. 1. Fig. 3 is a longitudinal section showing the position of the cutting point or knife. Fig. 4 is a perspective view of a modified form of my device.

The frame or base $a$ has the upwardly-extending portion $a'$. This upwardly-extending portion is cut away centrally upon its length, so as to form the surface $a^3$, which is concaved so as to conform substantially to the contour or surface of the shell of the egg when in place, as hereinafter described, and which acts as a guide, limiting the penetration of the knife and also acting as a fulcrum, as hereinafter specifically described. The guide $a^3$, however, may be made straight without departing from the spirit of my invention. Rigidly attached to the part $a$ and with its under and cutting edge facing and in a parallel plane with said upwardly-extending part $a'$ is a knife $b$, which may be attached to said base or frame in any suitable manner, as by fitting it into a slot $a^2$, Figs. 1 and 2, or into a mortise, as shown in Fig. 3, or by attaching it to the side of or by making it continuous with the upwardly-extending portion, as shown in Fig. 4.

In operation the egg is placed over the point of the knife $b$ in a position such that its major axis is substantially at right angles to the plane of the knife $b$. The point of the knife $b$ is first forced through the shell, so that the shell rests down upon the surface $a^3$, which acts as a guide, limiting the penetration of the knife $b$ into the interior of the egg. The egg is then rotated upon its axis in the direction which forces the interior surface of the shell upward against the cutting-edge of the knife $b$ and sliding the exterior surface upon the guide $a^3$, which acts also as a fulcrum between the edge of the knife $b$ and the power applied in rotating the egg. In this manner the knife $b$ is made to cut or tear the shell from inward outwardly and substantially in the opposite direction from the lines of a crushing force upon a hollow spherical body with reference to the point of cutting continuously as the egg is rotated, so that on the one hand the cutting is limited to a depth not liable to penetrate the yelk of the egg and on the other the cutting is accomplished without crushing the shell.

I claim—

1. In a device for opening hot boiled eggs, the combination of a base $a$, having an upwardly-projecting portion $a'$, and the guide $a^3$, with a knife $b$, which is rigidly attached to the base $a$ in such a manner that the plane of its cutting-edge is substantially at right angles to the surface of the guide $a^3$, substantially as and for the purposes set forth.

2. In a device for opening hot boiled eggs, the combination of a base $a$, having an upwardly-projecting portion $a'$ and concaved guides $a^3$, and a knife $b$, substantially as and for the purposes set forth.

3. In a device for opening hot boiled eggs, a base $a$, having an upwardly-projecting portion $a'$, a guide or fulcrum $a^3$, and knife $b$, the parts so arranged that the penetration of the knife $b$ is limited and that by rotation of the egg, as described, the shell is cut or torn from inward outwardly, substantially as and for the purposes set forth.

FRANKLIN NELSON JEWETT.

Witnesses:
 JAMES C. FRISBEE,
 GEORGE W. WARREN.